(12) United States Patent
Sharangpani et al.

(10) Patent No.: US 6,272,520 B1
(45) Date of Patent: Aug. 7, 2001

(54) METHOD FOR DETECTING THREAD SWITCH EVENTS

(75) Inventors: Harshvardhan Sharangpani, Santa Clara; Rajiv Gupta, Los Altos; Judge K. Arora, Cupertino, all of CA (US)

(73) Assignees: Intel Corporation, Santa Clara; Hewlette Packard, Palo Alto, both of CA (US)

( * ) Notice: Subject to any disclaimer, the term of this patent is extended or adjusted under 35 U.S.C. 154(b) by 0 days.

(21) Appl. No.: 09/001,545

(22) Filed: Dec. 31, 1997

(51) Int. Cl.$^7$ .................................................. G06F 9/00
(52) U.S. Cl. ............................ 709/108; 712/23; 712/205; 712/229; 709/102
(58) Field of Search ..................................... 712/217, 216, 712/219, 23, 25, 26, 205, 229; 709/100, 107, 108, 101, 103, 105

(56) References Cited

U.S. PATENT DOCUMENTS

| | | | | |
|---|---|---|---|---|
| 5,361,337 | * | 11/1994 | Okin ..................................... | 395/375 |
| 5,835,705 | * | 11/1998 | Larsen .................................... | 714/47 |
| 5,918,033 | * | 6/1999 | Heeb et al. ............................ | 395/393 |
| 5,933,627 | * | 8/1999 | Parady ................................... | 395/569 |
| 6,018,759 | * | 1/2000 | Doing .................................... | 709/108 |
| 6,088,788 | * | 7/2000 | Borkenhagen ....................... | 712/205 |

OTHER PUBLICATIONS

"Reducing Memory Latency via Non–blocking and Prefetching Caches" Tien–Fu Chen and Jean–Loup Baer, 1992 Seattle, WA, Univ. of Washington, Dep. of Comp. Science.*

"Evaluation of Multithreaded Uniprocessors for Commercial Application Environment", Richard J. Eickemeyer, et al., 1996.*

"Characterization of Alpha AXP Performance Using TP and SPEC Workload." Zarka Cvetanovic et al., IEEE, 1994.*

"Simultaneous Multithreading: A Platform For Next–Generation Processors", Eggers, et al., Dept. of Computer Science and Engineering, Seattle, WA, pp. 1–15.

Compilation Issues For A Simultaneous Multithreading Processor, Lo, et al., Dept. of Computer Science and Engineering, Seattle, WA, 2 pp.

"Converting Thread–Level Parallelism To Instruction–Level Parallelism Via Simultaneous Multithreading", Lo, et al., Dept. of Computer Science and Engineering, Seattle, WA, pp. 1–25.

"Simultaneous Multithreading: Maximizing On–Chip Parallelism", Tullsen, et al., Dept. of Computer Science and Engineering, Seattle, WA, pp. 1–12.

"Exploiting Choice: Instruction Fetch and Issue on an Implementable Simultaneous Multithreading Processor", Tullsen, et al., Dept. of Computer Science and Engineering, Seattle WA, pp. 1–12.

Increasing Superscalar Performance Through Multistreaming:, Yamamoto, et al., Proceedings of the IFIP WG10.3 Working Conference on Parallel Architectures and Compilation Techniques, pp. 1–10.

* cited by examiner

Primary Examiner—Majid Banankhah
(74) Attorney, Agent, or Firm—Leo V. Novakoski

(57) ABSTRACT

A method for detecting thread switch conditions provides first and second scoreboard bits for each register in a register file. The first scoreboard bit associated with a register is set when a load is generated to return data to the register. The second scoreboard bit is set if the load misses in a selected processor cache. Register read instructions are monitored, and a thread switch condition is indicated when a register read instruction to the register is detected while its first and second scoreboard bits are set.

12 Claims, 5 Drawing Sheets

METHOD FOR DETECTING THREAD SWITCH EVENTS

BACKGROUND OF THE INVENTION

1. Field of the Invention

The present invention relates to the processors, and in particular, to methods for implementing multithreading in processors.

2. Background Art

Modern high-performance processors are designed to execute a large number of instructions per clock, and to this end, they typically provide extensive execution resources. Additional execution resources are often provided on the processor to boost the absolute level of performance, even though the resources are not fully utilized across all the target applications of interest. Processor execution is often marred with stalls for instruction fetches, data cache misses, unresolved data-dependencies and branch latencies. On application workloads which stress the memory subsystem, the latency of delivering instructions and data from the next several levels of memory can be extremely high (100–200 clock cycles). This leads to long pipeline stalls, which leave execution resources on the chip under-utilized. For example, on contemporary processors, over 30% of the application time spent on OLTP-TPC-C (an on-line transaction processing benchmark) may be spent waiting for main memory to return instructions or data to the processor. This under-utilization of resources represents a loss in performance.

One proposed solution to exploit under-utilized resources enhances the processor to execute instructions from multiple process threads simultaneously. This solution is commonly referred to as multi-processors (MP)-on-a-chip or simultaneous multi-threading (SMT). In MP-on-a-chip, a single physical processor chip ("chip") appears as if it contains two or more logical processors, each executing its own process. In the following discussion, a distinct process executing on a distinct logical processor is referred to as a thread. The chip hardware resources are assigned to a new thread when a currently executing thread stalls waiting for dependent operations. Simultaneous multi-threading processors can even schedule resource utilization at the single instruction slot level.

Another approach to increasing resource utilization implements a coarse grained form of multi-threading. Coarse grained multi-threading switches utilization of chip resources from the currently executing thread to a new thread when the currently executing thread initiates a long latency operation. This reduces the likelihood of long pipeline stalls by allowing the second thread to execute while the long latency operation of the first thread completes.

Switching processor resources from one thread to another incurs a performance penalty, since the current thread's instructions must be flushed or drained from the pipeline, the thread's architectural state must be preserved, the new logical processor must be activated, and instructions from the new thread must be provided to the processor's resources. These steps can take tens of clock cycles (typically 20–40 clock cycles) to complete. Coarse-grained multi-threading thus enhances performance only when threads are switched on operations that would otherwise stall the processor longer than the time required to switch the threads.

Various events have been proposed for triggering thread switches. For example, long latency load operations, such as loads that miss in various stages of a processor's caches, may be used to trigger thread switches. However, not all such loads actually stall the pipeline, and even those operations that do stall the pipeline may not stall it long enough to justify the delay incurred by the thread switch operation. If the thread switch condition is not selected carefully, unnecessary thread switches can reduce or eliminate any performance advantage provided by multi-threading.

Thus, there is a need for methods that can trigger thread switches to avoid long pipeline stalls without generating unnecessary thread switches and maximize the benefits of course grained multithreading.

SUMMARY OF THE INVENTION

The present invention is a method for detecting thread switch conditions that support the efficient implementation of coarse-grained multi-threading.

In accordance with the present invention, a load generated to return data to a register is tracked, and a bit associated with the register is set if the load misses in a selected processor cache. Register read instructions are monitored, and a thread switch condition is indicated when a register read instruction to the register is detected while the associated bit is set.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

Figure 1:
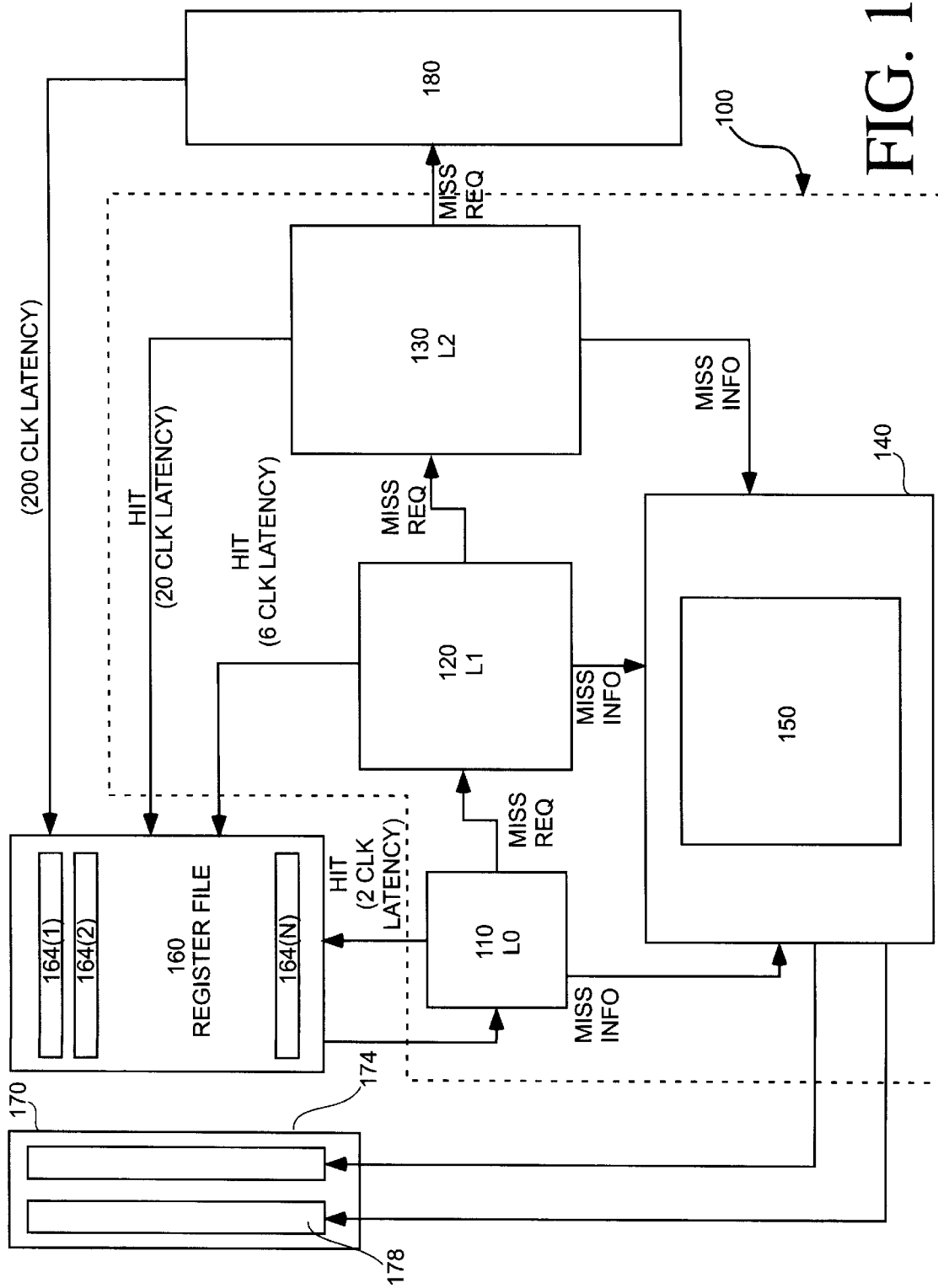
FIG. 1 is a block diagram of a cache system, register file, and memory suitable for implementing the present invention.

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

Coarse grained multi-threading provides its greatest performance advantage when thread switches are triggered for those operations that would otherwise stall the processor's pipeline for an interval that is significantly longer than the time required to switch threads. An exemplary thread switching processes may require on the order of 30 cycles to flush or drain the instructions of the current thread from the pipeline, preserve the thread's architectural state information, and retrieve instructions from the newly scheduled thread. Swapping out a thread when it stalls the pipeline for, e.g., 50 cycles or when it launches a long latency operation that never stalls the pipeline generates unnecessary thread switches.

Operations that trigger thread switches (thread switch events) ideally reflect both the latency of the operation and the likelihood that the pipeline will stall waiting for the operation to complete. Load operations that return data from the memory subsystem ("loads") have a range of latencies, depending on which part of the memory hierarchy provides the data. Loads that hit in the caches of a processor system typically take between 2 and 30 clock cycles to return data to the core pipeline. Loads that must access the data from main memory can have latencies on the order of 200 clock cycles. Distinguishing between loads that access different structures in the memory subsystem is a first step for identifying suitable thread switch events.

Processors typically support only limited tracking of load operations. For example, many processors include a scoreboard that tracks the availability of data in each register of a register file. Conventional scoreboards indicate if a particular register is waiting for data, but they do not indicate how long the wait is likely to be. Once the data request enters the memory subsystem, it is typically tracked by modules that do not communicate with the scoreboard or recognize which registers may be awaiting data targeted by the request.

In addition to the tracking problem, a long latency operation does not, by itself, mean that the pipeline will stall. Pipeline stalls only occur if the operation, e.g. load, does not return the requested data before the instruction that uses (consumes) the data issues. If the consuming instruction issues before the data is available, the pipeline stalls and remains stalled until the requested data is returned. For a load that hits in one of the processor's caches, the stall will typically be less than 30 clock cycles, since there is usually a delay of a couple of clock cycles between requesting the load and issuing the instruction that consumes the data provided by the load. The thread switch operation, which itself consumes 20 to 30 clock cycles, is not justified in these cases. On the other hand, load latencies of 200 clock cycles or more for accesses to main memory are more likely to stall the pipeline for significantly more than 30 clock cycles, since the instruction that consumes the data is likely to issue well within 200 clock cycles of the load. However, pipeline stalls are not guaranteed even in these cases. For example, the thread could enter a long loop before the consuming instruction issues. In the following discussion, "very long latency operations" refers to operations having latencies that are significantly longer than the latency of a particular thread switch operation. These are operations which, if they stall the pipeline, are likely to stall it long enough to justify a thread switch operation.

The present invention is a method for efficiently detecting very long latency pipeline stalls from among the many different types of operations that can lead to pipeline stalls. Data requests within the memory hierarchy are tracked and mapped back to the registers destined to received the requested data. A bit associated with a register is set when the mapping indicates that a request for data destined for the register misses in the processor's cache system. A thread switch condition is indicated if an issued instruction attempts to access data from a register for which the associated bit is set. Thread switches are thus initiated only for those loads that stall the pipeline and are likely to keep it stalled for periods in excess of the thread switch latency.

Referring now to FIG. 1, there is shown a block diagram of a cache system 100 suitable for detecting very long latency load operations. Also shown are a register file 160 and a main memory 180 that interact with cache system 100. In the disclosed embodiment, cache system 100 includes an L0 cache 110, an L1 cache 120, an L2 cache 130, and a cache management module 140. Cache management module 140 includes one or more buffer(s) 150 to track requests to caches 120, 130. In particular, buffer 150 stores information for mapping the data returned from load requests to specific registers 164 of register file 160.

Scoreboards are used to track the availability of data in each register of a register file when the data is returned by a longer latency, e.g. multicycle, operation. For shorter latency operations, e.g. those with latencies of 1–2 clock cycles, comparators are typically used to detect the availability of requested data, and the requested data is returned to the pipeline through staging latches and bypasses rather than through a register file. Shorter latency operations typically occur for simple arithmetic and logic unit (ALU) operations and loads that are satisfied from a low level cache. Since it is not efficient to trigger a thread switch unless the latency of the triggering operation exceeds the latency of the thread switch operation (approximately, 20–30 clock cycles), some method for detecting these very long latency operations is desirable.

In one embodiment of the present invention, a modified scoreboard 170 is associated with register file 160 and coupled to cache management module 140 to track data returns from very long latency operations. Scoreboard 170 includes first status register 174 for implementing the normal tracking function, i.e. tracking data availability in the register file. Each register, e.g. register 164(j), is associated with a status bit in first status register 174. The bit is set when a multicycle operation is generated to deliver data to associated register 164. In the disclosed embodiment, a bit in first status register 174 is set when a data request to an associated register 164 misses in cache 110 or when some other multicycle operation occurs.

A thread switch may be initiated if an instruction issues that consumes data in a register for which the associated bit in status register 174 is set. This approach, however, allows thread switches on loads that may hit in cache 120 or 130. An alternative approach is to indicate a thread switch when a load misses in cache 130 (or a higher level cache, if present), e.g. when cache management module 140 detects a load forwarded to main memory 180, which leads to a load operation of very long latency. While this approach is more efficient than the previous one, it also generates unnecessary thread switches, since the load will stall the processor's pipeline only if an instruction that consumes the data is issued before the data is returned by main memory 180.

In the present invention, scoreboard 170 is modified to detect only those very long latency events for which thread switching is very efficient. Scoreboard 170 includes a second status register 178 that contains a bit for each register 164 in register file 160. In this embodiment, cache management module 140 monitors load operations to determine when a load operation misses in (L2) cache 330. When such a cache miss is detected, the register(s) for which the requested data is destined is identified and a corresponding bit in second status register 178 is set. The register is determined using translation information in buffer(s) 150.

Figure 2:
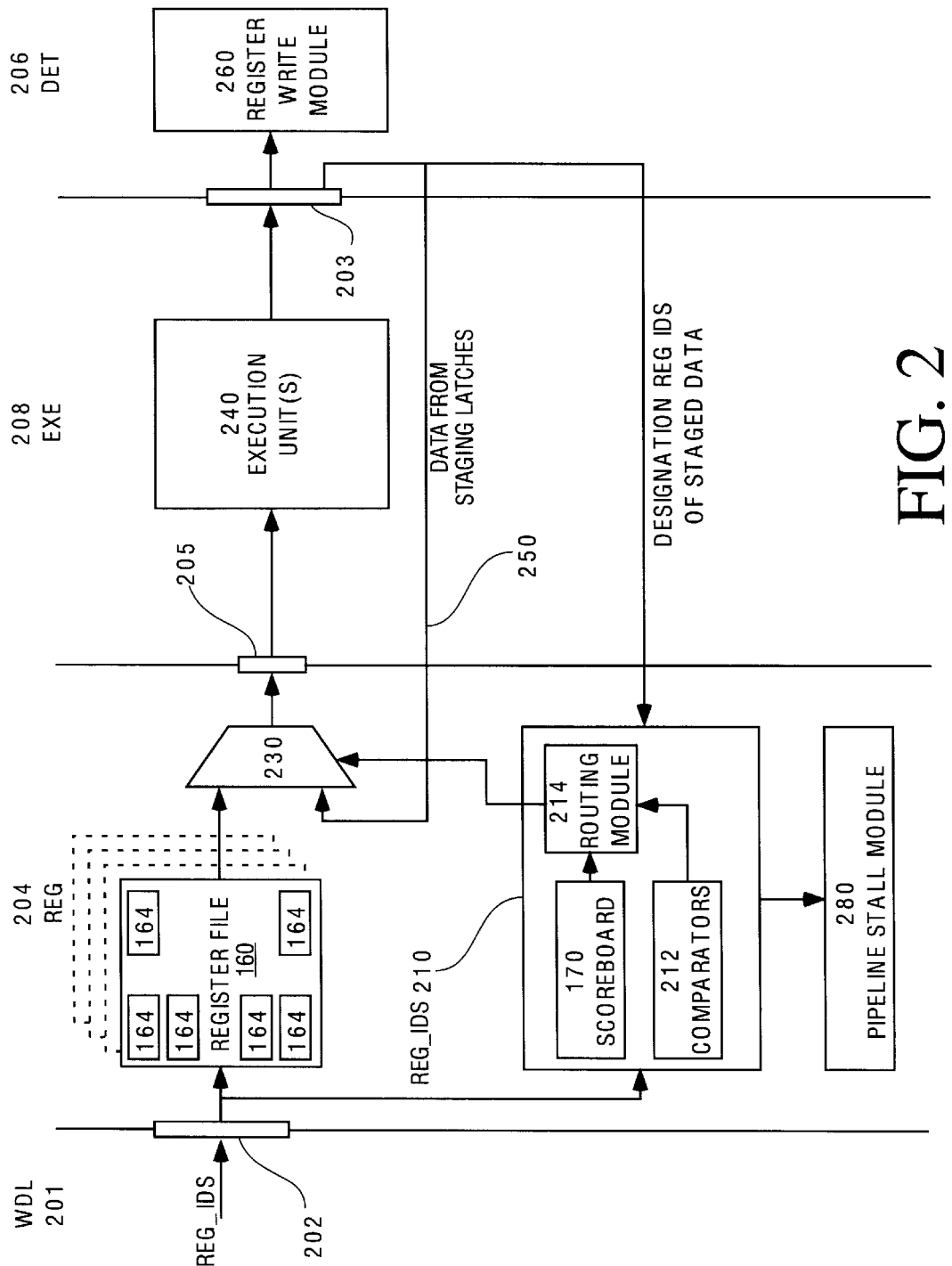
FIG. 2 is a block diagram of register and execute stages of a processor pipeline that is suitable for implementing the present invention.

A thread switch module is coupled to monitor scoreboard 170 and execution pipeline (FIG. 2). If an instruction issues that consumes data in a register for which both bits of modified scoreboard 170 are set, the execution pipeline stalls. The present invention attributes the stall to a very long latency load operation to main memory 180, and the thread switch module initiates a thread switch operation. This allows a different thread to make use of the resources of the processor's pipeline while the load operation for the previous thread is completed.

In order to accommodate concurrent processing of multiple threads, scoreboard data must be tracked for each thread. In one embodiment of the present invention, status registers 174, 178 are replicated to track data availability for each thread.

FIG. 2 shows a portion of a processor pipeline 200 suitable for monitoring and updating register file 160 and scoreboard 170 in accordance with the present invention. In particular, register (REG) and execute (EXE) stages 204, 208, respectively, of processor pipeline 200 are shown. REG stage 204 includes a register file 160, an operand delivery and control (ODC) module 210, and an operand bypass MUX 230. A staging latch 205 couples data from REG stage 204 to EXE stage 208.

EXE stage 208 includes one or more execution units 240. Execution unit 240 implements instructions using data provided by register file 160 or by other execution units through bypass line 250. Data generated by instructions executed in EXE stage 208 is typically written back to register file 160 in DET stage 206. This writeback updates the architectural state of the currently executing thread in register file 160.

Latch 202 couples register identification indicators (REG_IDs) from a previous stage 201 to REG stage 204. Stage 201 is typically a wordline decode (WLD) stage, that includes circuitry for decoding an instruction to determine which register(s) contains (or will eventually contain) the data needed by the instruction in EXE stage 208. The data is provided to register file 160 by loads from memory or through execution of a prior instruction in EXE stage 204. Where the data is generated by execution of a prior instruction, it is written to register file 160 by register write module 260 in DET stage 206. Occasionally, the data is required as soon as it is generated, in which case it may be provided directly from execution unit 240 through bypass line 250.

Movement of data into and out of register file 160 and through MUX 230 is monitored by ODC module 210. In the disclosed embodiment of pipeline 200, ODC module 210 includes scoreboard 170, comparators 212, and routing logic 214. ODC module 210 monitors REG_IDs from latch 202 and bypass line 254 to update scoreboard 170 and route data to execution unit 240 from register file 160 or, if necessary, through bypass line 250. In addition, status bits 174 of scoreboard 170 are updated to reflect loads or other multicycle operations for corresponding registers 164 and status bits 178 are updated to reflect any loads that miss in cache 130 (FIG. 1).

Comparator(s) 212 monitors REG_IDs from staging latches 202, 203 and the status of corresponding register 164 from scoreboard. 170. Comparator 212 triggers routing logic 214 if a read request targets a REG_ID (from latch 202) for which the requested data is not available in register file 160 but can be provided through bypass 250.

Pipeline stall module 280 is coupled to scoreboard 170 and comparator 212 to determine when pipeline 200 will stall. In particular, if data for an indicated REG_ID from latch 202 is not available in register file 160 (status bit 174 for specified REG_ID is set) or from bypass 250, pipeline 200 stalls. The present invention also checks the status bit 178 of scoreboard 170 to determine whether the data for which pipeline 200 is stalled is being provided by a long latency load, e.g. a load from main memory 180. If both scoreboard bits 174, 178 are set for a REG_ID for which pipeline 200 is stalled, a thread switch condition is indicated.

Figure 3:
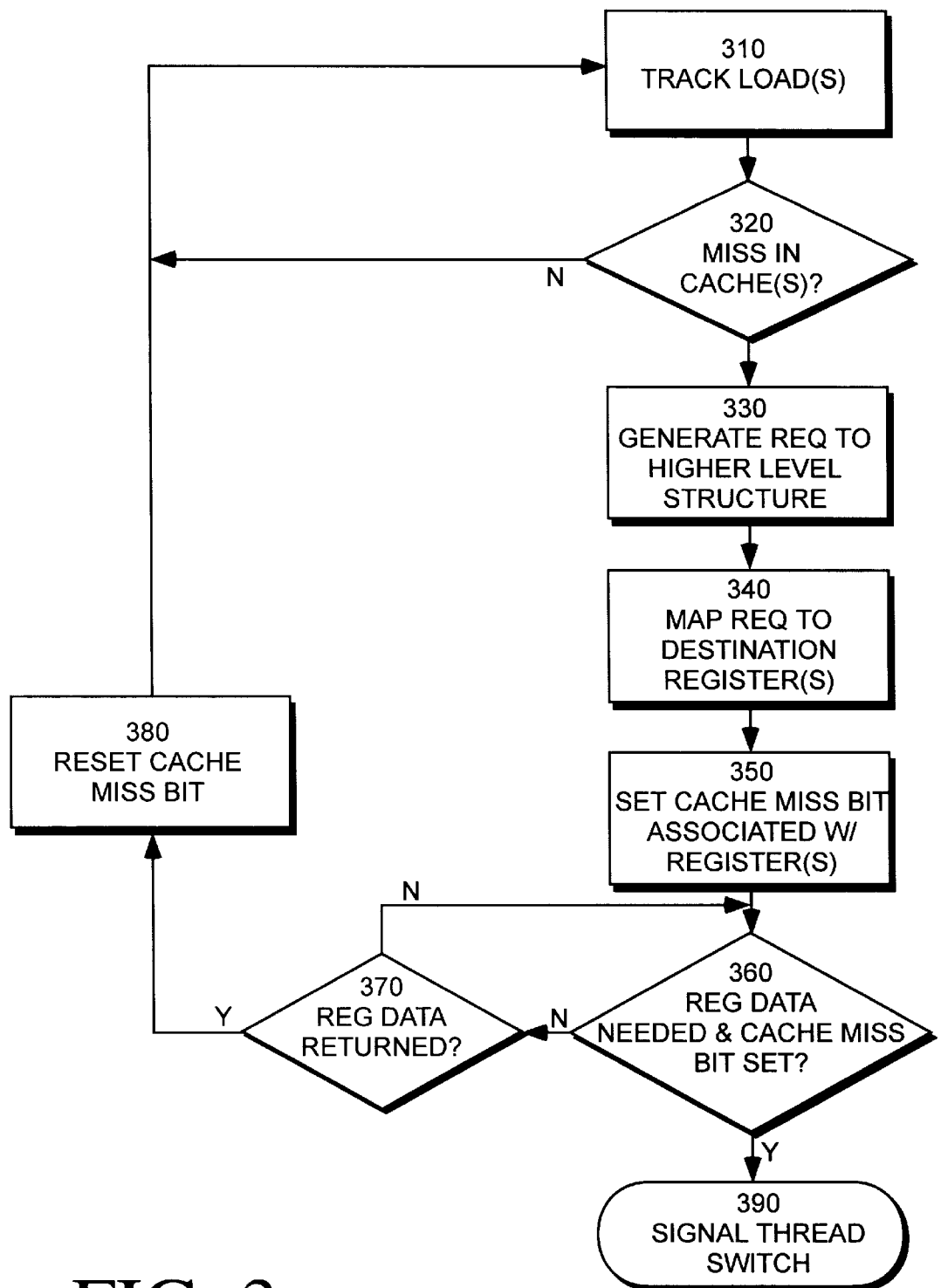
FIG. 3 is a flow chart of the method of the present invention.

Referring now to FIG. 3, there is shown one embodiment of a method 300 in accordance with the present invention for triggering thread switches on read requests to registers awaiting data from very long latency load operations. Method 300 monitors 310 loads in a memory system, and determines 320 when a load misses in a low level cache(s). Here, low level caches refers to those caches in close proximity to the processor that have small access latencies, e.g. caches 110, 120 in the disclosed embodiment. When such a miss is detected 320, a bus request (REQ) is generated 330 to retrieve the data from a higher level structure(s) in the memory system. The bus REQ is mapped 340 to each register destined to receive data returned by the REQ, and a cache miss bit, e.g. second scoreboard bit 178, is set for each register identified by mapping step 340.

A register read queue is checked 360 to determine whether an instruction tries to access the register(s) for data. If an instruction tries to access 360 the data in a register for which both scoreboard bits are set, a thread switch condition is indicated 390. If no instruction tries to access the data, it is determined 370 whether the data has been returned from main memory. If it has been returned 370, the cache miss bit is reset 380 and method 300 returns to step 310. If the data has not been returned 370, method 300 continues checking 360, 370 for accesses to the data and its return from memory.

In FIG. 3, it is assumed that the first scoreboard bit is set for any register awaiting data from an operation that requires more than a couple of clock cycles to complete, i.e. any mulicycle operation. Method 300 may be modified for very long latency operations other than selected loads. For example, step 320 may represent detection of floating point transcendental functions that return data to a register. In this case, the register for which the second scoreboard bit is set is the target register to which the value of the transcendental function is returned. If step 320 is instead detection of an interrupt time out, the second scoreboard bits are set for all registers whose first scoreboard bits are set. Method 300 may be implemented in any of a variety of mutli-threaded processors. One multi-threaded processor for which method 200 is suitable is a course grained multi-threaded processor that employs a shadow register file to minimize the die cost of bookkeeping and storage structures necessary to track the status of multiple threads. A processor employing a shadow register file for multi-threading is also described in U.S. patent application Ser. No. 09/001,546, now abandoned, entitled Multiple Processors on a Chip Using a Shadow Register File, filed on even data herewith assigned to the same assignee.

The shadow register file is a multi-ported storage structure that provides access to multiple storage arrays, each capable of storing data representing the architectural state of an associated thread. The multiple data arrays share a common set of wires or access ports to couple data in and out of the register file. The use of multiple storage arrays with a common set of access ports allows the register file to accommodate multiple architectural states with low incremental cost. A select signal line specifies architectural state data in one of the multiple arrays for access. The use of a common set of wires for multiple data arrays allows the architectural state data for multiple threads to be stored on the processor (on chip) in a multi-ported register file that is not significantly larger than a conventional multi-ported register file.

The shadow register file provides multiple sets of storage cells into which architectural state data for multiple threads may be preloaded, without requiring additional read and write ports to access the architectural state data. A control line couples different sets of storage cells to the common set of wires, as and when architectural state data for the different threads is required. In effect, architectural state data for the currently executing thread is held in a set of foreground registers, while architectural state data for the other threads are held in one or more sets of background registers.

Figure 4:
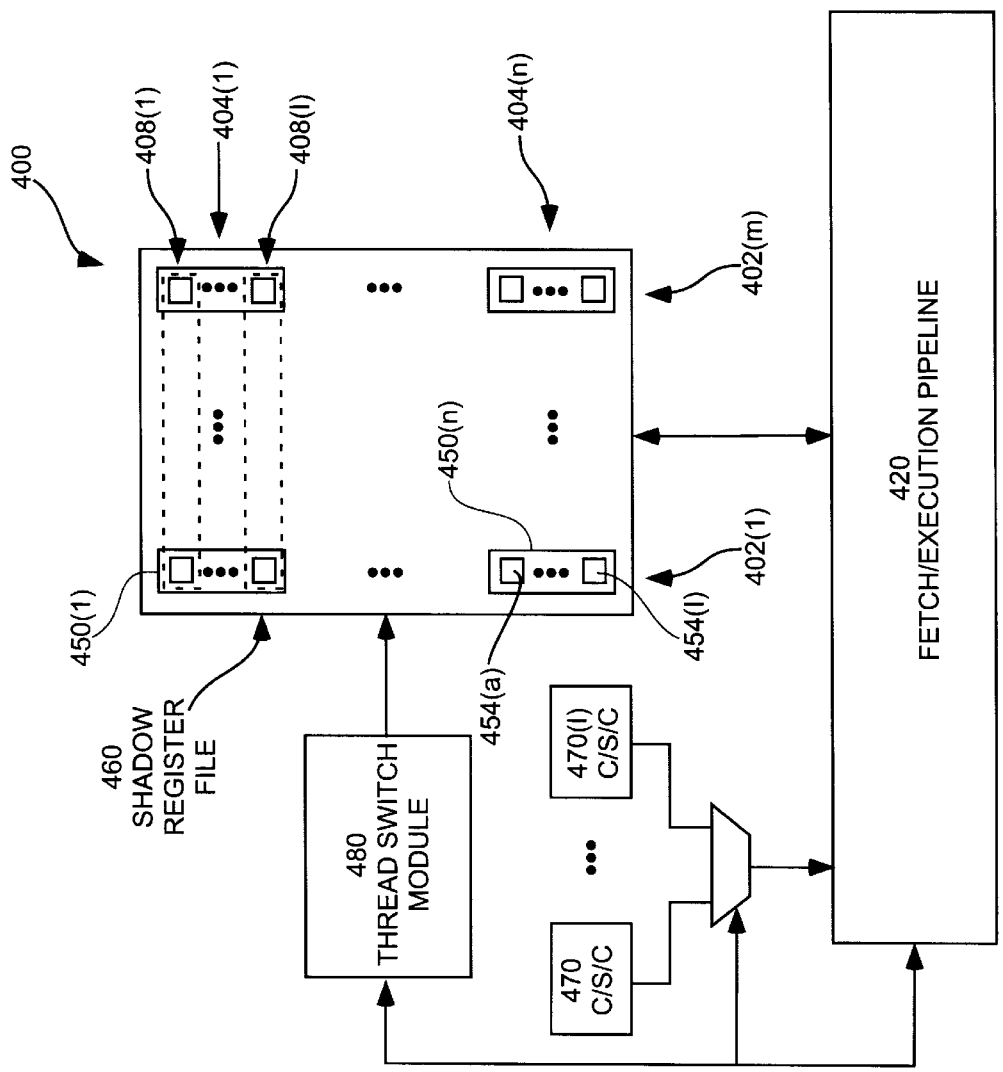
FIG. 4 is a block diagram of one embodiment of a multi-threaded processor in which the present invention may be implemented.

Referring now to FIG. 4, there is shown a block diagram of one embodiment of a processor 400 suitable for implementing the thread switch method of the present invention. Processor 400 includes a fetch/execution (core) pipeline 420, a shadow register file 460 coupled to the core pipeline 420, and a thread switch module 480 coupled to shadow register file 460. Shadow register file 460 is capable of storing architectural state data for multiple threads. In particular, shadow register file 460 comprises m columns 402 of n cells 450, where each cell 450 includes multiple storage elements 454(a)–454(l) (collectively, storage elements 454). By providing multiple storage elements 454 for each cell 450, each row 404 of cells effectively provides l registers 408(a)–408(l) of storage capacity, and shadow register file 460 provides storage capacity for architectural state data from l threads. Architectural state data for a $j^{th}$ thread may be stored in a selected storage elements, e.g. 454(j), of each cell 450 and accessed according to a signal controlled by thread switch module 470.

Also shown in FIG. 4 are system, control and status (S/C/S) registers 470(1)–470(l), one for each of the l threads that may be scheduled concurrently on processor 400. In the disclosed embodiment of processor 400, separate S/C/S registers 470 are provided for each thread, since replicating these smaller registers does not significantly increase the die area of the processor. In this embodiment, integer and floating point architectural state data for a given thread is preloaded into a set of storage elements, e.g. shadow storage elements 454(j), while system, control, and status architectural state data is preloaded into S/C/S registers 470(j).

An alternative embodiment of processor 400 may implement S/C/S registers 470 as a single shadow register file, similar to that described above. In this embodiment, S/C/S register files 470(1)–470(l) are replaced with a single, shadow S/C/S register file in each of a plurality of storage arrays that share a common set of wires are preloaded with system, control, and status architectural state data for one of the multiple threads.

Thread switch module 480 monitors the status of core pipeline 420 for a thread switch event during processing of the currently scheduled thread. In the present invention, thread switch module 480 initiates a thread switch when a load initiated by the current thread misses in the caches (FIG. 1) of processor 400, and a consumer instruction stalls waiting for the requested data. When such a thread switch event is detected, thread switch module 480 passes control of core pipeline 420 to a new thread and reconfigures shadow register file 460 to bring to the foreground the architectural data associated with the new thread. Architectural state data is deemed to be in the foreground when it is accessible through the common wires of shadow register file 460. As discussed below, this may be accomplished by transferring the desired architectural state data from its current array of storage elements 454, e.g. elements 454(j), to a selected array of storage elements 454, e.g. elements 454(a) that is coupled to the common wires (FIG. 4A). Alternatively, the array of elements 454 containing the desired architectural state data may be coupled to the common wires.

To switch threads, core pipeline 420 is flushed or drained of instructions from the currently executing thread, the new logical processor is activated by bringing the architectural state of the corresponding thread into the foreground, and fetch engine 424 is resteered to fetch instructions indicated by the instruction pointer of the new thread. However, the thread switch does not wait for previously issued memory accesses from the current thread to complete, nor are these accesses flushed or drained from the memory pipeline. Rather, these accesses overlap with execution of instructions from a new thread. In particular, these accesses continue to execute in the memory subsystem and return data to staging memory buffers while the new thread executes on core pipeline 420. The returned data may be transferred to the appropriate array of shadow register file 460 when the corresponding thread is next granted control of core pipeline 420 and the array is accessible through the common wires of shadow register file 460.

Figure 5:
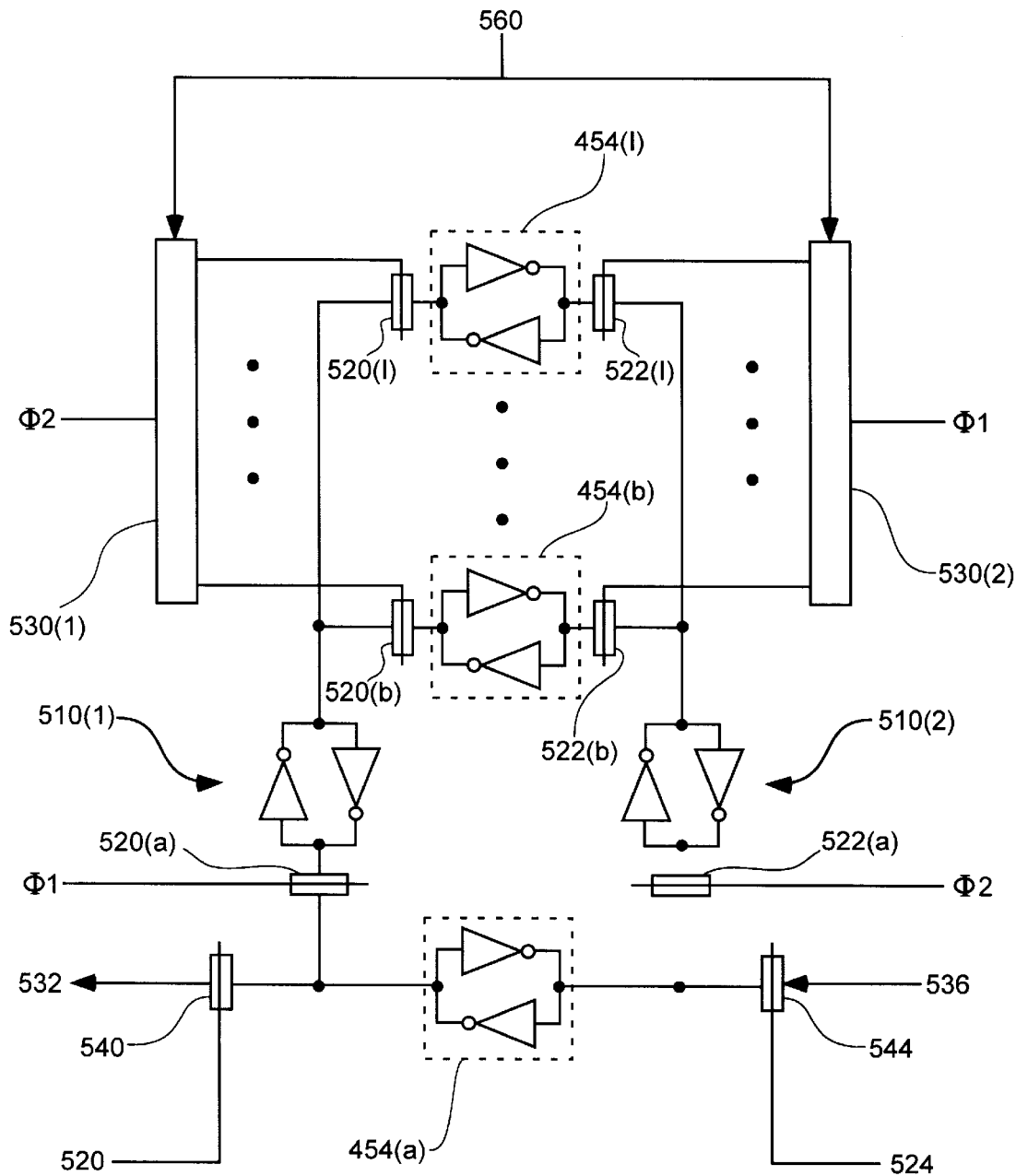
FIG. 5 is a block diagram of one embodiment of a shadow register storage element that is suitable for use in the processor of FIG. 4.

Referring now to FIG. 5, there is shown one embodiment of a cell 450 having l storage elements 454(a)–454(l). Cell 450 includes a foreground storage element 454(a) and (l–1) background storage elements 454(b)–454(l). A pair of transfer elements 510(1), 510(2) and a pair of pass gates 520(a), 522(a), couple foreground element 454(a) to background elements 454(b)–454(l). Pass gates 520(a) and 522(a) are driven by transfer signals φ1 and φ2, respectively. Switches 540 and 544 couple foreground storage element 354(a) to a read line 532 and write line 536, respectively. Switches 540 and 544 are activated by a WR line 520 and a WW line 524, respectively.

It is understood that for multiple-ported shadow register file 460, e.g. h-read ports, k-write ports, switch 544, WR line 520, and read line 532 comprise h-switches 540, h-WR lines 520, and h-read lines 532, respectively. Each of h-switches 540 is driven by one of h-WR lines 520 to couple cell 550 to one of h-read lines 532. Similarly, switch 544, WW line 524, and write line 536 comprise k-switches 544, k-WW lines 524, and k-write lines 536.

Background elements 454(b)–454(l) are similarly coupled to transfer elements 510(1), 510(2) through pairs of pass gates 520(b), 522(b) to 520(l), 522(l), respectively. φ2 is selectively coupled to pass gates 520(b)–520(l) through a select module 530(1). Similarly, φ1 is selectively coupled to pass gates 522(b)–522(l) through a select module 530(2). Select modules 530(1), 530(2) are driven by control signal 560 to apply φ2 and φ1 to one of pass gates 520 and 522, respectively.

Application of signals φ1 and φ2 to pass gates 520, 522 allows data in one of background storage elements 454(b)–454(l) to be moved to foreground storage element 454(a), where it may be accessed by read, write lines 532, 536, respectively. Control signal 560 determines which of background storage cells 454(b)–454(l) is coupled to foreground storage element 454(a). For example, applying φ1 to pass gates 520(a) and 522(b) moves data from foreground storage element 454(a) and background storage element 454(b) into transfer elements 510(1) and 510(2), respectively. Applying φ2 to pass gates 522(a) and 520(b) moves the data in transfer elements 510(2) and 510(1) into foreground element 454(a) and background element 454(b), respectively. Applying this process to each cell 450, moves architectural state data for a thread into foreground storage elements 354(a), where it can be read and written under control of the thread. This is done simultaneously for all cells of the register file.

In one embodiment of cell 450, signals φ1 and φ2 are successive phases of a clock signal. In another embodiment of cell 450, signals φ1 and φ2 are successive cycles of a clock signal.

There has thus been provided a method for detecting long latency pipeline stalls suitable for triggering a thread switch in a multi-threaded processor. The method employs a modified scoreboard to track the availability of data in specific registers and the status of loads that return data destined for these registers. A first scoreboard bit associated with a register is set when a multicycle operation that returns data to the register, such as a load to the processor's lower level caches, is detected. A second scoreboard bit (a load miss bit) associated with the register is set if the load misses in the lower level caches, indicating a very long latency operation, such as a request to memory, is required. A register read queue is monitored to determine whether an instruction needs the data being accessed by the long latency operation. A thread switch condition is indicated when an instruction tries to access a register which is awaiting data from a very long latency read operation, e.g. when the register's first and second scoreboard bits are set.

The present invention has been described using loads from main memory as exemplary very long latency operations. However, other very long latency operations may be used to set the second scoreboard bits of effected registers in the register file. For example, floating point transcendental operations, such as logarithms, sines, cosines and the like, can take on the order of 200 clock cycles to return data. When these operations are detected, the second scoreboard bit for the registers to which they return data may be set. A thread switch condition then occurs if a subsequent instruction tries to read the register (whose first and second scoreboard bits are set). In addition, other non-register specific operations may be used to set the second scoreboard bit. The very long latency operations include, for example, interrupt time outs and serialization conditions in multi-processor systems.

What is claimed is:

1. A method for detecting a thread switch condition on a multi-threaded processor, the method comprising:
   setting a first bit associated with a register if data requested for the register is unavailable in a first cache;
   setting a second bit associated with the register if a load to return the requested data misses in a second cache;
   monitoring register read instructions; and
   indicating a thread switch condition if an instruction attempts to read the register while the first and second bits are set.

2. The method of claim 1, further comprising seeking the requested data in the second cache if the data is unavailable in the first cache.

3. The method of claim 1, further comprising accessing the data from main memory if the load misses in the second cache.

4. A method for triggering thread switches in a multi-threaded processor, the method comprising:
   generating a load to return data to a register;
   setting a first scoreboard bit associated with the register if the data is unavailable in a low level cache;
   generating a bus request to main memory and setting a second scoreboard bit if the data is unavailable in one or more higher level caches; and
   indicating a thread switch operation if an instruction tries to read the register while the first and second scoreboard bits are set.

5. The method of claim 4, wherein generating a bus request and setting the second scoreboard bit further comprises:
   identifying each register associated with the bus request when a corresponding load misses in the one or more higher level caches; and
   setting the second scoreboard bit for each register associated with the bus request.

6. The method of claim 5, wherein indicating further comprises:
   monitoring a register read queue; and
   setting a thread switch signal when a register read targets a register having its first and second scoreboard bits set.

7. A system for processing multiple execution threads, the system comprising:
   shadow register file, the shadow register file having multiple sets of registers for storing architectural state data for multiple threads;
   a scoreboard that provides a first bit to indicate if data is available in a register of the register file and a second bit to indicate if a load that targets the data missed in a selected cache;
   an execution pipeline;
   a memory pipeline including one or more selected caches and a main memory to service loads from the execution pipeline; and
   a thread switch system to monitor loads in the memory pipeline, to set the second bit responsive to a request that misses in the selected caches, and to trigger a thread switch operation if an instruction in the execution pipeline attempts to access the register while its first and second scoreboard bits are set.

8. The system of claim 7, wherein the thread switch system signals the shadow register file to access data from a different set of registers when a thread switch operation is triggered.

9. A system for detecting a thread switch condition on a multi-threaded processor, the method comprising:
   tracking operations that return data to a register;
   setting a scoreboard bit associated with the register if a tracked operation misses in a first cache;
   setting a second bit associated with the register if a tracked operation misses in a second cache; and
   indicating a thread switch condition when an instruction that reads the register is received while the first and second bits are set.

10. The method of claim 9, further comprising setting the first bit if a transcendental operation that returns data to the register is detected.

11. The method of claim 9, wherein the setting step comprises setting a scoreboard bit associated with the register when a load that returns data to the register misses in a selected processor cache.

12. The method of claim 9, further comprising setting the first bit if an interrupt time out is detected.

* * * * *